US008954241B2

(12) United States Patent
Ruth

(10) Patent No.: US 8,954,241 B2
(45) Date of Patent: Feb. 10, 2015

(54) MINING TRUCK SPOTTING UNDER A SHOVEL

(75) Inventor: Eric Ruth, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 137 days.

(21) Appl. No.: 13/572,038

(22) Filed: Aug. 10, 2012

(65) Prior Publication Data
US 2014/0046540 A1  Feb. 13, 2014

(51) Int. Cl.
*E02F 9/20* (2006.01)
*E02F 9/24* (2006.01)

(52) U.S. Cl.
CPC ........ *E02F 9/2045* (2013.01); *G05D 2201/021* (2013.01)
USPC .......................................................... 701/50

(58) Field of Classification Search
CPC ..................... E02F 9/2045; G05D 2201/021
USPC ............................................. 701/41, 301, 50
See application file for complete search history.

(56) References Cited

U.S. PATENT DOCUMENTS

| 4,659,970 | A |   | 4/1987 | Melocik |
| 6,044,312 | A | * | 3/2000 | Sudo et al. ................. 701/25 |
| 6,134,493 | A |   | 10/2000 | Kaneko |
| 6,247,538 | B1 | * | 6/2001 | Takeda et al. ................. 172/2 |
| 6,268,803 | B1 | * | 7/2001 | Gunderson et al. .......... 340/903 |
| 6,321,147 | B1 |   | 11/2001 | Takeda et al. |
| 6,363,632 | B1 | * | 4/2002 | Stentz et al. ................. 37/414 |
| 6,389,334 | B1 |   | 5/2002 | Castor |
| 6,393,362 | B1 | * | 5/2002 | Burns .......................... 701/301 |
| 6,480,769 | B1 |   | 11/2002 | Kageyama |
| 6,484,078 | B1 |   | 11/2002 | Kageyama |
| 6,502,016 | B1 |   | 12/2002 | Ozaki et al. |
| 6,539,294 | B1 |   | 3/2003 | Kageyama |
| 6,646,568 | B2 |   | 11/2003 | MacPhail et al. |
| 6,799,100 | B2 |   | 9/2004 | Burns et al. |
| 7,966,106 | B2 |   | 6/2011 | Sudou et al. |
| 7,969,558 | B2 |   | 6/2011 | Hall |
| 8,170,787 | B2 | * | 5/2012 | Coats et al. .................... 701/301 |
| 8,583,361 | B2 | * | 11/2013 | Lewis et al. .................... 701/408 |
| 2011/0273310 | A1 |   | 11/2011 | Kadowaki et al. |
| 2012/0114181 | A1 | * | 5/2012 | Borthwick et al. ............. 382/104 |
| 2012/0136524 | A1 | * | 5/2012 | Everett et al. .................... 701/24 |
| 2012/0327261 | A1 | * | 12/2012 | Tafazoli Bilandi et al. ............. 348/222.1 |
| 2013/0211712 | A1 | * | 8/2013 | Takeda .......................... 701/468 |
| 2013/0325208 | A1 | * | 12/2013 | Osagawa et al. .................. 701/2 |
| 2014/0019042 | A1 | * | 1/2014 | Sugawara et al. .............. 701/431 |

FOREIGN PATENT DOCUMENTS

| EP | 2402219 A1 | | 1/2012 | |
| JP | 06083443 A | * | 3/1994 | ............... G05D 1/02 |
| JP | 08263138 A | * | 10/1996 | ............... G05D 1/02 |
| JP | 09244745 A | * | 9/1997 | ............... G05D 1/02 |
| JP | 11249740 A | * | 9/1999 | ............... G05D 1/02 |
| WO | WO 9612973 A1 | * | 5/1996 | ............... G01S 5/14 |
| WO | 2010064989 A1 | | 6/2010 | |

OTHER PUBLICATIONS

Duff, Elliot, "Tracking a vehicle from a rotating platform with a scanning range laser", Australasian Conference on Robotics and Automation (ACRA) 2006, Dec. 6-8, 2006, Auckland, New Zealand, 7 pages, downloaded from http://www.araa.asn.au/acra/acra2006/papers/paper_5_56.pdf.*

* cited by examiner

*Primary Examiner* — Behrang Badii
*Assistant Examiner* — David Testardi
(74) *Attorney, Agent, or Firm* — Baker Hostetler

(57) ABSTRACT

This disclosure is generally drawn to methods, systems, devices and/or apparatus related to aligning a mining truck with a shovel. Specifically, some of the disclosed example methods, systems, devices and/or apparatus relate to semi-automatic and/or automatic alignment of mining trucks relative to shovel during mining loading operations.

16 Claims, 6 Drawing Sheets

MINING TRUCK SPOTTING UNDER A SHOVEL

TECHNICAL FIELD

The present disclosure generally relates to alignment of mining trucks under a shovel. More specifically, the present disclosure relates to automatic and/or semi-automatic alignment of large mining trucks under a shovel used in mining operations.

BACKGROUND

The present disclosure contemplates that mining operations involve large vehicles, including mining trucks and shovels. Moving such large vehicles is conventionally a time-consuming process due to safety concerns and difficulties in navigating while driving and/or parking.

One use of large vehicles in mining operations includes transporting excavated materials (e.g., soil, rock, ore, coal, sand) around and/or away from a mining site. Conventional mining trucks include a cab for the vehicle's operator and a truck body for receiving and hauling material. Many vehicle operations, including aligning a vehicle under a shovel to receive material from a shovel (i.e., spotting), involve difficult and/or dangerous maneuvers.

When spotting a large vehicle such as a mining truck near a shovel, an operator must align the mining truck substantially near and under the shovel to reduce spillage of material during transfer from the shovel to the mining truck's truck body. At the same time, the mining truck operator must be cautious to avoid backing into the shovel during the spotting process. Accidents may occur or respotting may be necessary due to limited visibility and/or lack of operator skill. If an operator requires multiple attempts to properly spot the mining truck under the shovel, time and fuel may be wasted during the respotting process. Repositioning the shovel relative to the mining truck is slow, impractical, and dangerous.

There are several existing methods for vehicle-assisted manuvearing for trucks. International Publication No. WO 2010/064989 to Hilliges, et al., for example, relates to backing up a truck to a loading dock for loading and/or unloading cargo. Hillegas relates to a moving truck operating in a reversing direction to a fixed loading dock. Hillegas system and method attempts to avoid unwanted contact between truck and the loading dock. The problem addressed by Hillegas is less complex than that posed in mining environments. In mining environments, the location of excavation loading zones may vary based on the progress and speed of mining activities, the requirements of the mining shovel, and/or considerations of the mining environment. Additionally, Hillegas does not address operator interaction associated with manuvearing a truck.

In an effort to increase efficiency of truck operation to avoid wasting time to avoid respotting a mining truck to receive a load from a shovel, and to avoid truck accidents, a semi-automatic or automatic system and/or process may be beneficial.

SUMMARY

In a first aspect, an example system for aligning a mining vehicle under a shovel is provided. The vehicle may include a transmission, a throttle, and a steering mechanism. The example system may include a communication interface, distance sensor(s), steering sensor(s), and an electronic control module. An example communication interface may be configured to direct an operator of the mining vehicle to perform vehicle operation(s). Example distance sensor(s) may be configured to measure a distance between the mining vehicle and the shovel. Example steering sensor(s) may be configured to determine a steering angle associated with the steering mechanism. An example electronic control module may be configured to cause the mining vehicle to accelerate, decelerate, and/or turn. An example electronic control module may also be configured to repeatedly receive the distance from the distance sensor(s), repeatedly receive the steering angle from the steering sensor(s); and adjust the throttle and/or the steering mechanism based on the distance and/or the steering angle.

In a second aspect, an example method of aligning a mining vehicle with a shovel is provided. The mining vehicle may include a transmission, a throttle and a steering mechanism. The example method may include prompting an operator of the mining vehicle to shift the mining vehicle transmission in a reversing gear; measuring the distance between the rear of the mining vehicle and the front of the shovel; measuring the distance between a side portion of the mining vehicle and a side portion of the shovel; measuring a steering angle of the steering mechanism; controlling the mining vehicle steering mechanism and the mining vehicle throttle to reduce the distance between the rear of the mining vehicle and the front of the shovel; and controlling the mining vehicle steering mechanism and the mining vehicle throttle to reduce the distance between a side portion of the mining vehicle and a side portion of the shovel.

In a third aspect, an example system for aligning a mining vehicle with a shovel is provided. An example mining vehicle may include a transmission, a throttle and a steering mechanism. The example system may include sensor(s), a communication interface, and an electronic control module. The sensor(s) may be coupled to a mining vehicle, and they may be configured to measure a distance between the mining vehicle and a shovel, a location of the shovel relative to the mining truck, an orientation of the shovel relative to the mining truck, and/or a steering angle of the steering mechanism. The communication interface may be configured to instruct a mining vehicle operator to perform vehicle operations. The electronic control module may be configured to receive the distance, the location, the orientation, and/or the steering angle from the sensor(s). The electronic control module may also be configured to control the throttle based on the distance, the location, the orientation, and/or the steering angle. The electronic control module may further be configured to adjust the steering mechanism based on the distance, the location, the orientation, and/or the steering angle.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
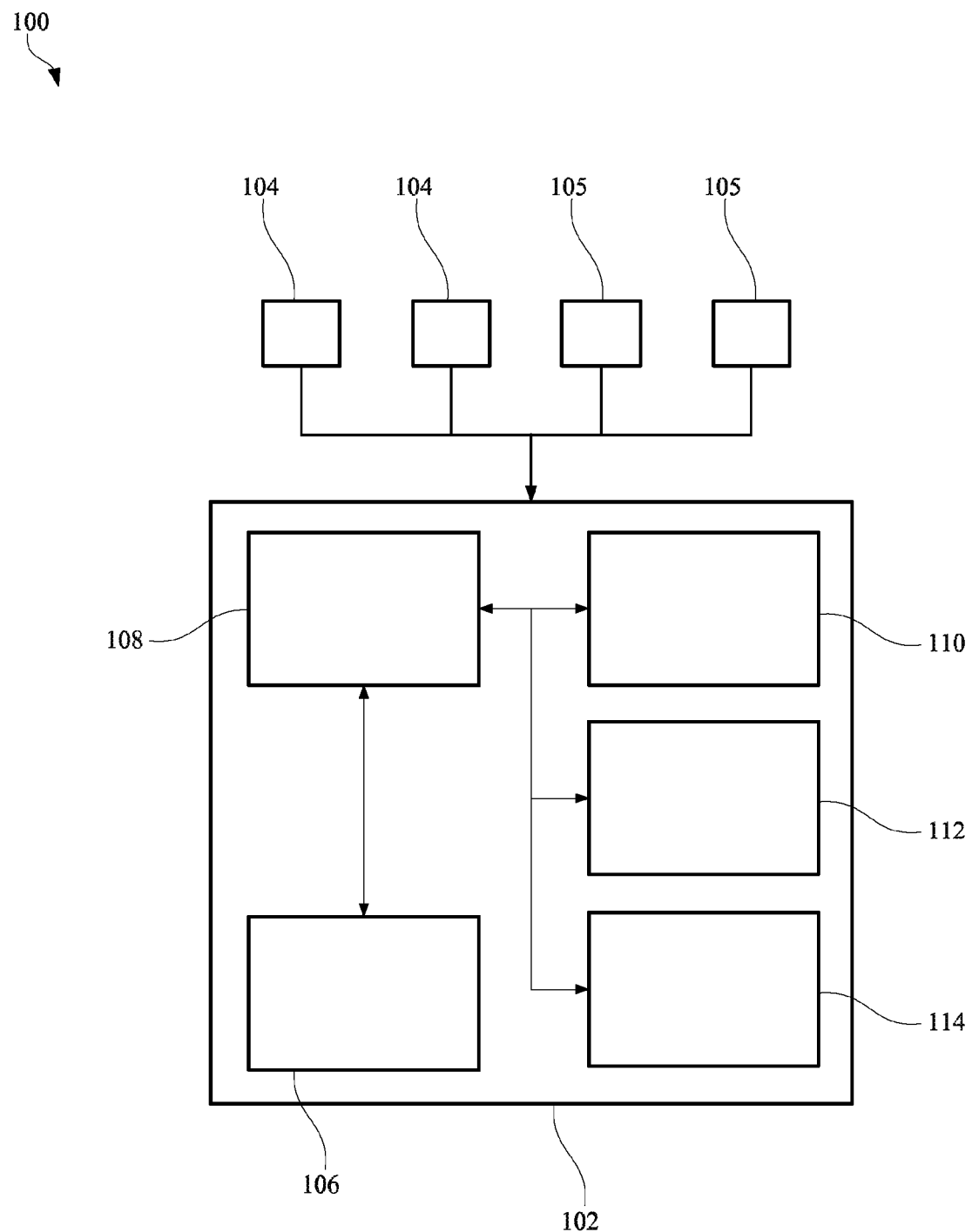
FIG. 1 depicts a schematic view of an example spotting system.

FIG. 1 depicts a schematic view of an example system 100 for aligning a mining vehicle 102 under a shovel. The vehicle 102 may include a transmission (or drive system) 110, a throttle 112, and a steering mechanism 114. The example system 100 may include a communication interface 106, distance sensor(s) 104, steering angle sensor(s) 105, and an electronic control module 108. An example communication interface 106 may be configured to direct an operator of the mining vehicle 102 to perform vehicle operation(s). Example distance sensor(s) 104 may be configured to measure a distance between the mining vehicle 102 and the shovel. Example steering sensor(s) 105 may be configured to determine a steering angle associated with the steering mechanism 114. An example electronic control module 108 may be configured to cause the mining vehicle 102 to accelerate, decelerate, and/or turn. An example electronic control module 108 may also be configured to repeatedly receive the distance from the distance sensor(s) 104 and adjust the throttle 112 and/or the steering mechanism 114 based on the distance. An example electronic control module 108 may also be configured to repeatedly receive the distance from the steering sensor(s) 105 and adjust the throttle 112 and/or the steering mechanism 114 based on the steering angle. An example electronic control module 108 may also be configured to adjust the throttle 112 and/or the steering mechanism 114 based on the distance and/or the steering angle. Example transmissions (or drive systems) 110 may include mechanical transmissions, electrical transmissions and/or electro-mechanical transmissions. Example vehicle operations that the communication interface 106 may instruct may include stopping the mining vehicle 102, reversing the mining vehicle 102, decelerating the mining vehicle 102, accelerating the mining vehicle 102, and/or steering the mining vehicle 102. Example steering sensors 105 may be integrated within the control system of the mining vehicle 102 and/or may be placed near one or more wheels of the mining vehicle 102.

Figure 2:
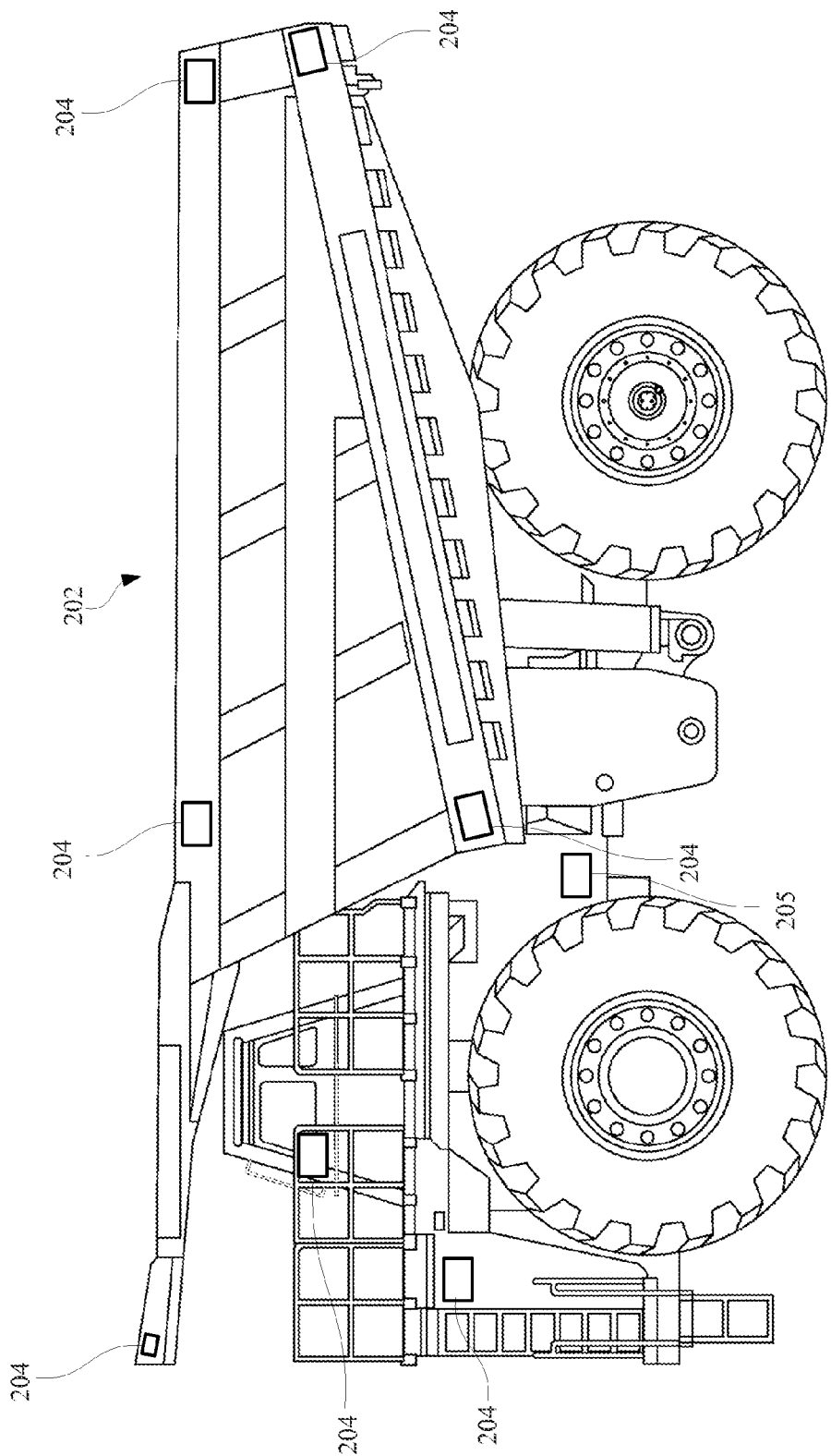
FIG. 2 depicts an example mining truck including example spotting systems.

Sensors 204 (e.g., distance sensors, location sensors and/or orientation sensors) may be located at one or more locations on and/or around a mining vehicle 202. Several examples of such locations are depicted in FIG. 2. While FIG. 2 depicts example placement locations for sensors 204, sensors 204 may be located at any location in which the sensor 204 may operate to determine the distance, location and/or orientation of a shovel. Some sensors 204 may measure or determine a lateral distance between the mining vehicle 202 and the shovel. Some sensors 204 may measure or determine a distance between the side of the mining vehicle 202 and the side of the shovel. Some sensors 204 may be laser-based sensors (e.g., laser sensor), light-based sensors (e.g., Light Detection And Ranging (LIDAR) sensor), radio-based sensors (e.g., Radio Detection And Ranging (RADAR) sensor), sound-based sensors (e.g., Sound Navigation And Ranging (SONAR) sensor, ultrasonic sensor) and/or satellite-based sensors e.g., global positioning system sensor). Example steering sensors 205 (e.g., cylinder position sensors) may be integrated within the control system of the mining vehicle 202 and/or may be placed near one or more wheels of the mining vehicle 202.

Figure 3:
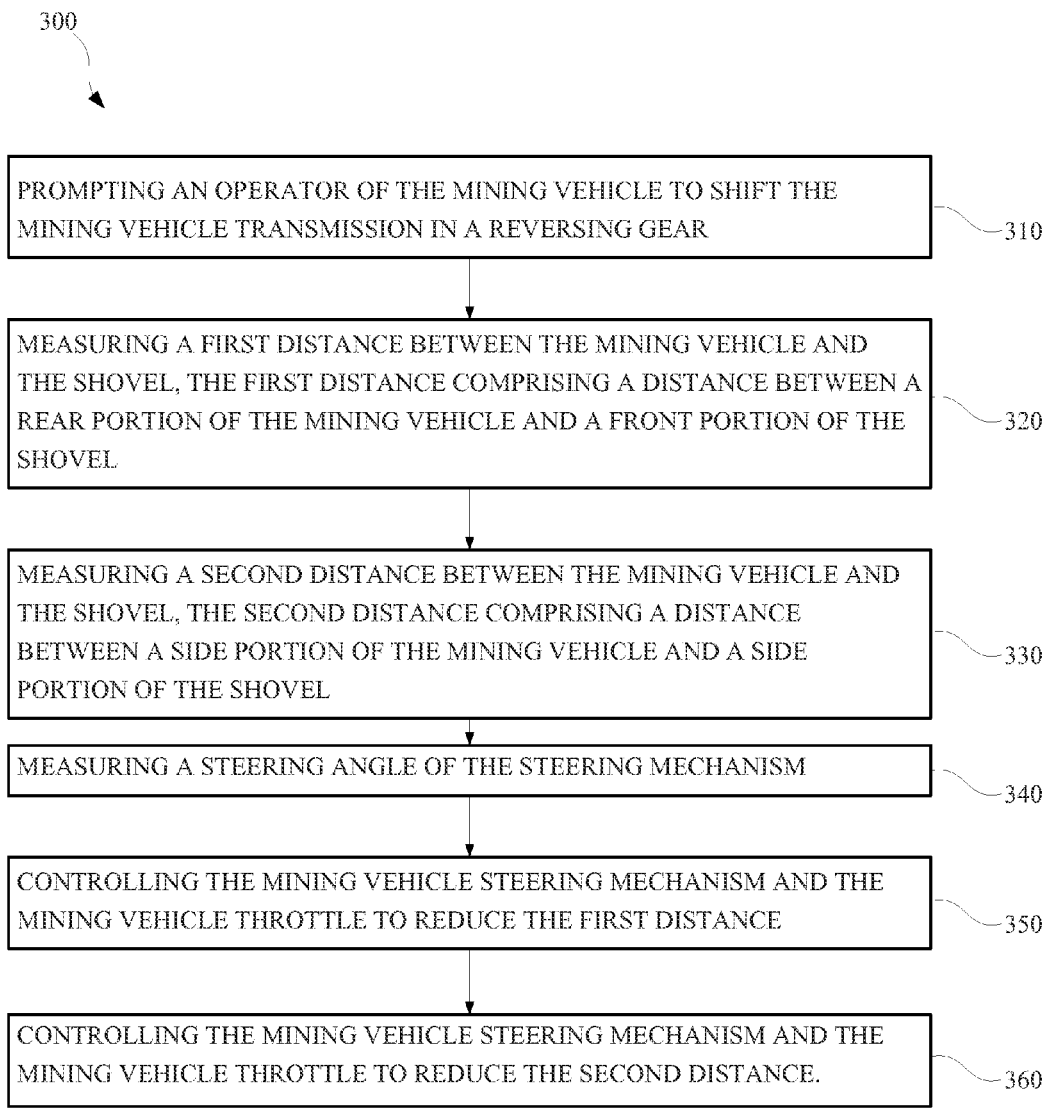
FIG. 3 depicts an example method of aligning a mining truck and a shovel.

FIG. 3 depicts an example method 300 of aligning a mining vehicle with a shovel. The mining vehicle may include a transmission, a throttle and a steering mechanism. The example method may include operations 310, 320, 330, 340, 350, and 360. Example operations may include prompting 310 an operator of the mining vehicle to shift the mining vehicle transmission in a reversing gear. The distance between the rear of the mining vehicle and the front of the shovel may be measured 320. The distance between a side portion of the mining vehicle and a side portion of the shovel may also be measured 330. The steering angle of the steering mechanism may be measured and/or obtained 340. The mining vehicle steering mechanism and the mining vehicle throttle may be controlled 350 to reduce the distance between the rear of the mining vehicle and the front of the shovel. The mining vehicle steering mechanism and the mining vehicle throttle may be controlled 360 to reduce the distance between a side portion of the mining vehicle and a side portion of the shovel. In some examples, operations may be repeated continuously and/or periodically.

Figure 4:
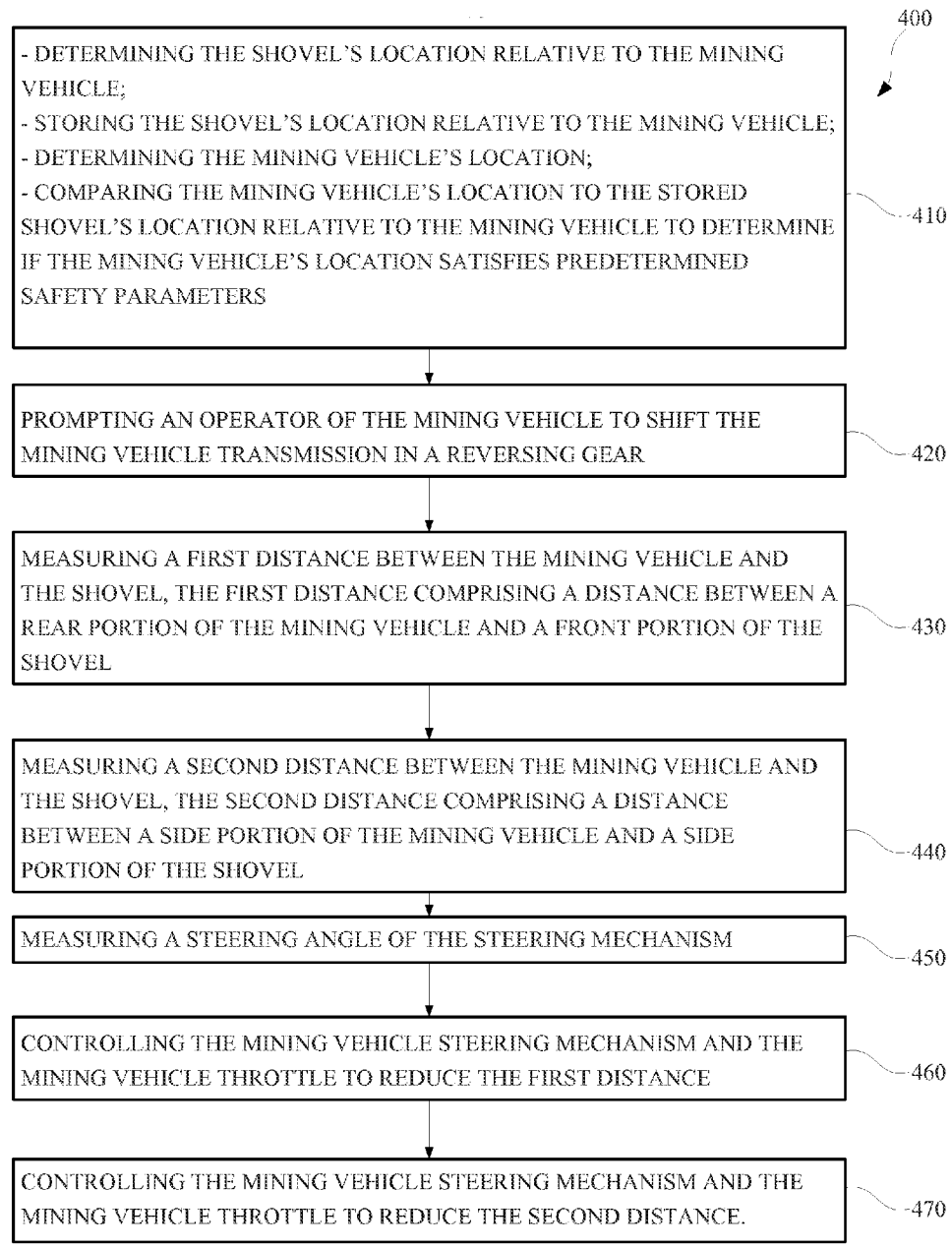
FIG. 4 depicts an example method of aligning a mining truck and a shovel.

FIG. 4 depicts an example method 400 of aligning a mining vehicle with a shovel. The mining vehicle may include a transmission, a throttle and a steering mechanism. The example method may include operations 410, 420, 430, 440, 450, 460, and 470. Example operations may include 410, determining the shovel's location relative to the mining vehicle, storing the shovel's location relative to the mining vehicle, determining the mining vehicle's location, and comparing the mining vehicle's location to the stored shovel's location relative to the mining vehicle to determine if the mining vehicle's location satisfies predetermined safety parameters. Example operations may also include prompting 420 an operator of the mining vehicle to shift the mining vehicle transmission in a reversing gear. The distance between the rear of the mining vehicle and the front of the shovel may be measured 430. The distance between a side portion of the mining vehicle and a side portion of the shovel may also be measured 440. The steering angle of the steering mechanism may be measured and/or obtained 450. The mining vehicle steering mechanism and the mining vehicle throttle may be controlled 460 to reduce the distance between the rear of the mining vehicle and the front of the shovel. The mining vehicle steering mechanism and the mining vehicle throttle may be controlled 470 to reduce the distance between a side portion of the mining vehicle and a side portion of the shovel. In some examples, operations may be repeated continuously and/or periodically.

Some example systems for aligning a mining vehicle 102 with a shovel may include sensor(s) 104, 105, a communication interface 106, and an electronic control module 108. The sensor(s) 104, 105 may be coupled to a mining vehicle 102, and they may be configured to measure a distance between the mining vehicle 102 and a shovel, a location of the shovel relative to the mining vehicle 102, and/or an orientation of the shovel relative to the mining vehicle 102. The communication interface 106 may be configured to instruct a mining vehicle 102 operator to perform vehicle operations. The electronic control module 108 may be configured to receive the distance, the location, and/or the orientation from the sensor(s) 104, 105. The electronic control module 108 may also be configured to control the throttle 112 based on the distance, the location, and/or the orientation. The electronic control module 108 may further be configured to adjust the steering mechanism 114 based on the distance, the location, and/or the orientation.

Example vehicle operations that the communication interface 106 may instruct may include applying the mining vehicle's 102 brake, engaging gears of the transmission 110, disengaging gears of the transmission 110, and/or adjusting the throttle 112. Example communication interfaces 106 may be integrated into the mining vehicle's 102 instrument panel and/or may be standalone devices. In some examples, visual and/or audible instructions may be provided to the operator. In some examples, visual instructions may be provided via one or more of the mining vehicle's 102 mirrors (e.g., side mirror).

Figure 5:
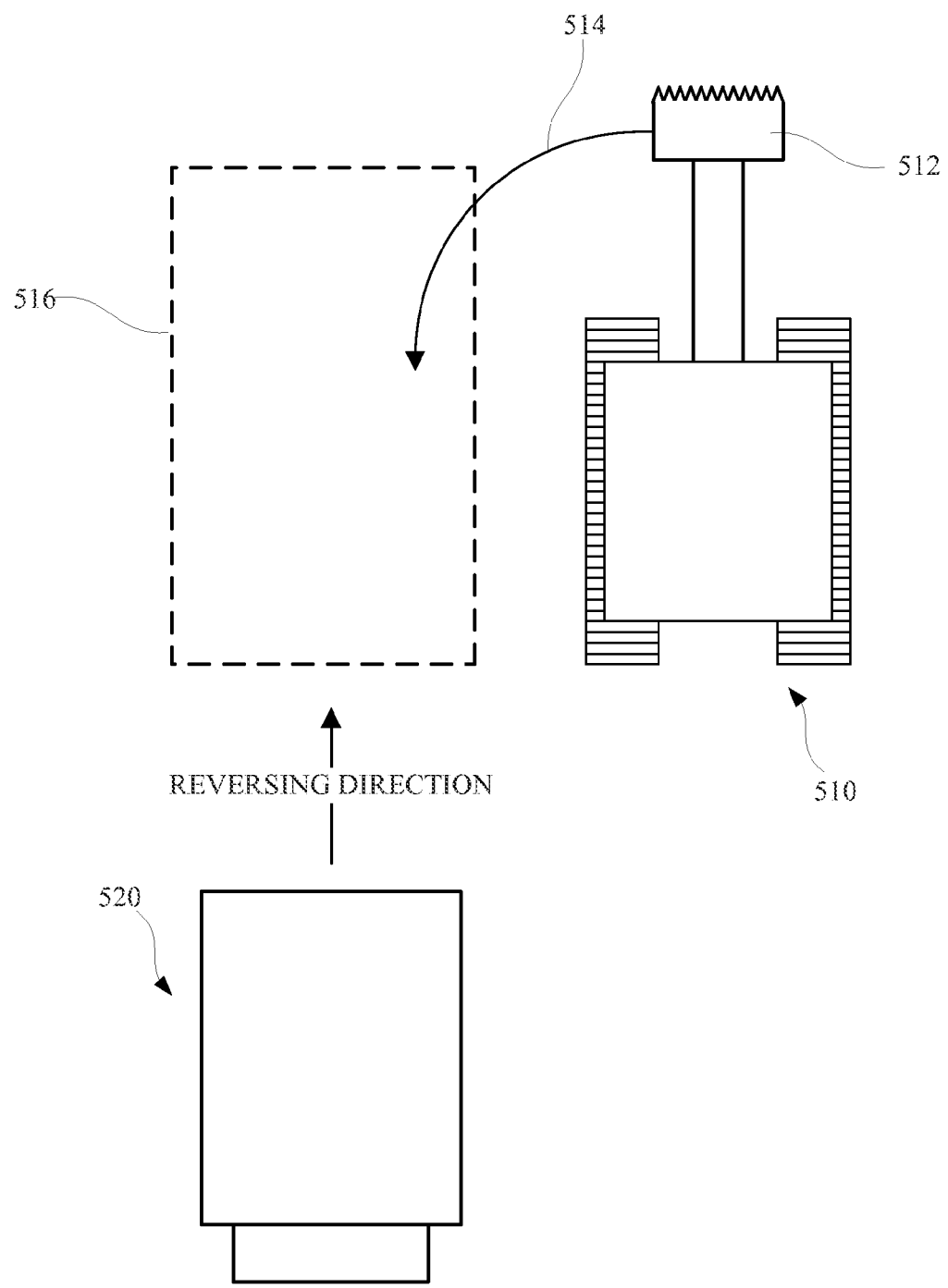
FIG. 5 depicts an overhead schematic view of example alignment of mining truck and a shovel in an example mining loading operation.
Figure 6:
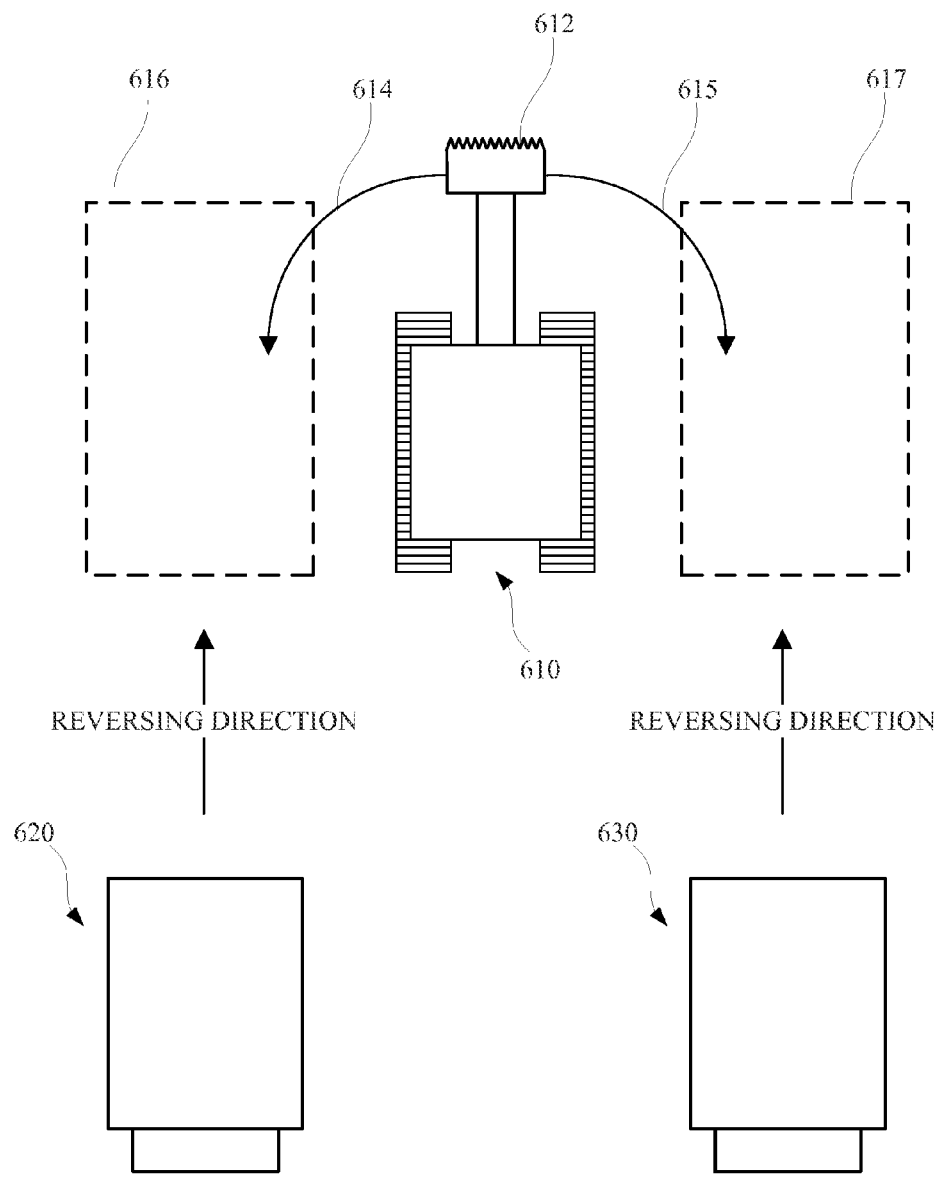
FIG. 6 depicts an overhead schematic view of example alignment of mining truck and a shovel in an example mining loading operation, all arranged in accordance with at least some embodiments of the present disclosure.

FIGS. 5-6 depict overhead schematic views of example alignment of mining vehicle 520, 620, 630 and a shovel 510, 610 in an example mining loading operation. FIG. 5 depicts an overhead schematic view of a single side loading environment. FIG. 6 depicts an overhead schematic view of a double side loading environment.

In the example of FIG. 5, a shovel 510 is performing mining operations. In doing so, the shovel's 510 bucket 512 may be at least partially filled with excavated materials (e.g., soil, rock, ore, coal, sand). To empty bucket 512, the shovel 510 operator may maneuver the bucket 512 along the example bucket path 514 to truck loading zone 516. The bucket 512 operator may expect a mining vehicle 520 to be located in truck loading zone 516 to transfer the contents of the bucket 512 to the mining vehicle 520. In some examples, the mining vehicle 520 may be oriented such that the rear of the mining vehicle 520 faces the truck loading zone 516. The mining vehicle 520 may operate in a reversing direction to approach the truck loading zone 516 to receive the contents of the bucket 512. Example systems (as described herein) may be implemented to at least semi-automatically align the mining vehicle 520 into the truck loading zone 516.

In FIG. 6, a shovel 610 is performing mining operations. In doing so, the shovel's 610 bucket 612 may be at least partially filled with excavated materials (e.g., soil, rock, ore, coal, sand). To empty bucket 612, the shovel 610 operator may maneuver the bucket 612 along the first example bucket path 614 to first truck loading zone 616. The bucket 612 operator may expect a first mining vehicle 620 to be located in first truck loading zone 616 to transfer the contents of the bucket 612 to the first mining vehicle 620. In some examples, the first mining vehicle 620 may be oriented such that the rear of the first mining vehicle 620 faces the first truck loading zone 616. The first mining vehicle 620 may operate in a reversing direction to approach the first truck loading zone 616 to receive the contents of the bucket 612. Example systems (as described herein) may be implemented to at least semi-automatically align the first mining vehicle 620 into the first truck loading zone 616. After the bucket 612 transfers its contents to first mining vehicle 620, it may resume mining operations. When the bucket 612 is again at least partially filled with excavated materials, the shovel 610 operator may maneuver the bucket 612 along the second example bucket path 615 to second truck loading zone 617. The bucket 612 operator may expect a second mining vehicle 630 to be located in second truck loading zone 617 to transfer the contents of the bucket 612 to the second mining vehicle 630. In some examples, the second mining vehicle 630 may be oriented such that the rear of the second mining vehicle 630 faces the second truck loading zone 617. The second mining vehicle 630 may operate in a reversing direction to approach the second truck loading zone 617 to receive the contents of the bucket 612. Example systems (as described herein) may be implemented to at least semi-automatically align the second mining vehicle 630 into the second truck loading zone 617. This alternating process may then continue.

Industrial Applicability

In mining operations, example systems and methods in accordance with the descriptions herein may be employed so that mining trucks may quickly and efficiently maneuver into a position suitable to receive excavated materials from mining shovels.

In an example, the mining truck operator may operate the mining truck near an excavation loading zone such that the mining truck's rear substantially faces the excavation loading zone. A communication interface may instruct the operator to engage the mining truck's transmission or drive control in a reversing direction. An example system may continuously or periodically monitor the relative location of the shovel and one or more distances between the mining truck and the shovel. An example system may also continuously or periodically monitor a steering angle of the mining truck to determine and make steering angle adjustments needed to maneuver the mining truck into the excavation loading zone. An electronic control module may be located on the mining truck to cause the mining truck to accelerate, decelerate, and adjust the steering angle. The throttle and steering mechanism may be engaged and/or adjusted to effectuate actions to minimize the distance between the mining truck and the shovel within predetermined safety parameters.

In some examples, multiple mining trucks may employ the example systems and methods described herein. This may allow mining trucks to simultaneously maneuver into respective excavation loading zones adjacent a shovel when an excavation site is so configured.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for aligning a mining vehicle under a shovel, the vehicle comprising a transmission, a throttle, and a steering mechanism, the system comprising:
   a communication interface configured to direct an operator of the mining vehicle to perform one or more vehicle operation, including at least one of engaging a reversing gear of the transmission and reversing the mining vehicle;
   one or more distance sensor mounted to the mining vehicle and configured to measure, by using at least one of a laser sensor, a LIDAR sensor, a RADAR sensor, a SONAR sensor, and an ultrasonic sensor, a distance between the mining vehicle and the shovel and a location and orientation of the shovel relative to the mining vehicle;
   one or more steering sensor configured to determine a steering angle associated with the steering mechanism; and
   an electronic control module configured to:
      cause the mining vehicle to at least one of accelerate, decelerate, and adjust the steering angle;
      repeatedly receive the distance measured by the one or more distance sensor;
      repeatedly receive the steering angle from the one or more steering sensor; and
      adjust at least one of the throttle and the steering mechanism based, at least in part, on at least one of the distance measured by the one or more distance sensor and the steering angle.

2. The system of claim 1, wherein the one or more vehicle operation includes:

stopping the mining vehicle;
decelerating the mining vehicle;
accelerating the mining vehicle; and
steering the mining vehicle.

3. The system of claim 1, wherein at least one of the one of more distance sensor is configured to measure a lateral distance between a rear portion of the mining vehicle and a front portion of the shovel.

4. The system of claim 1, wherein at least one of the one of more distance sensor is configured to measure a distance between a side of mining vehicle and a side of the shovel.

5. A method of aligning a mining vehicle with a shovel, the mining vehicle comprising a transmission, a throttle and a steering mechanism, the method comprising:
   prompting an operator of the mining vehicle to shift the mining vehicle transmission in a reversing gear;
   measuring, by a distance sensor comprising at least one of a laser sensor, a LIDAR sensor, a RADAR sensor, a SONAR sensor, and an ultrasonic sensor mounted on the mining vehicle, a first distance between the mining vehicle and the shovel, the first distance comprising a distance between a rear portion of the mining vehicle and a front portion of the shovel;
   measuring, by the distance sensor mounted on the mining vehicle, a second distance between the mining vehicle and the shovel, the second distance comprising a distance between a side portion of the mining vehicle and a side portion of the shovel;
   measuring a steering angle of the steering mechanism;
   controlling the steering mechanism and the throttle to reduce the first distance; and
   controlling the steering mechanism and the throttle to reduce the second distance.

6. The method of claim 5, further including: repeating at least one of measuring a first distance between the mining vehicle and the shovel, measuring a second distance between the mining vehicle and the shovel, controlling the steering mechanism and the throttle to reduce the first distance, and controlling the steering mechanism and the throttle to reduce the second distance.

7. The method of claim 5, further including:
   prior to prompting an operator of the mining vehicle to shift the mining vehicle transmission in a reversing gear:
      determining the shovel's location relative to the mining vehicle;
      storing the shovel's location relative to the mining vehicle;
      determining the mining vehicle's location; and
      comparing the mining vehicle's location to the stored shovel's location relative to the mining vehicle to determine if the mining vehicle's location satisfies predetermined safety parameters.

8. The method of claim 5, wherein controlling the steering mechanism and the throttle to reduce the first distance includes adjusting the steering mechanism based, at least in part, on the measured steering angle; and wherein controlling the steering mechanism and the throttle to reduce the second distance includes adjusting the steering mechanism based, at least in part, on the measured steering angle.

9. A system for aligning a mining vehicle with a shovel, the mining vehicle comprising a transmission, a throttle and a steering mechanism, the system comprising:
   one or more sensor comprising at least one of a laser sensor, a LIDAR sensor, a RADAR sensor, a SONAR sensor, and an ultrasonic sensor coupled to a mining vehicle, the one or more sensor configured to measure at least one of a distance between the mining vehicle and a shovel, a location of the shovel relative to the mining vehicle, an orientation of the shovel relative to the mining vehicle, and a steering angle of the steering mechanism;
   a communication interface configured to instruct a mining vehicle operator to perform one or more vehicle operations, including at least one of engaging a reversing gear of the transmission and reversing the mining vehicle; and
   an electronic control module configured to receive at least one of the distance, the location, the orientation, and the steering angle from the one or more sensor, and further configured to control the throttle based, at least in part, on at least one of the distance, the location, the orientation, and the steering angle, and further configured to adjust the steering mechanism based, at least in part, on at least one of the distance, the location, the orientation, and the steering angle, so as to align the mining vehicle with the shovel.

10. The system of claim 9, wherein the one or more sensor is configured to periodically measure at least one of the distance, the location, the orientation, and the steering angle.

11. The system of claim 10, wherein the one or more vehicle operations include:
   applying the mining vehicle's brake;
   engaging one or more gears of the transmission;
   disengaging one or more gears of the transmission; and
   adjusting the throttle.

12. The system of claim 9, wherein the communication interface is integrated with the mining vehicle's instrument panel.

13. The system of claim 9, wherein the communication interface is incorporated in a standalone device.

14. The system of claim 9, wherein the communication interface is integrated with at least one of the mining vehicle's mirrors.

15. The system of claim 9, wherein the communication interface configured to instruct a mining vehicle operator to perform one or more vehicle operations includes one or more audible instructions.

16. The system of claim 9, wherein the communication interface configured to instruct a mining vehicle operator to perform one or more vehicle operations includes one or more visual instructions.

* * * * *